March 27, 1928.
W. H. REICHARD
1,664,088
ELECTRICAL CONTROL DEVICE
Filed May 24, 1923
2 Sheets-Sheet 1
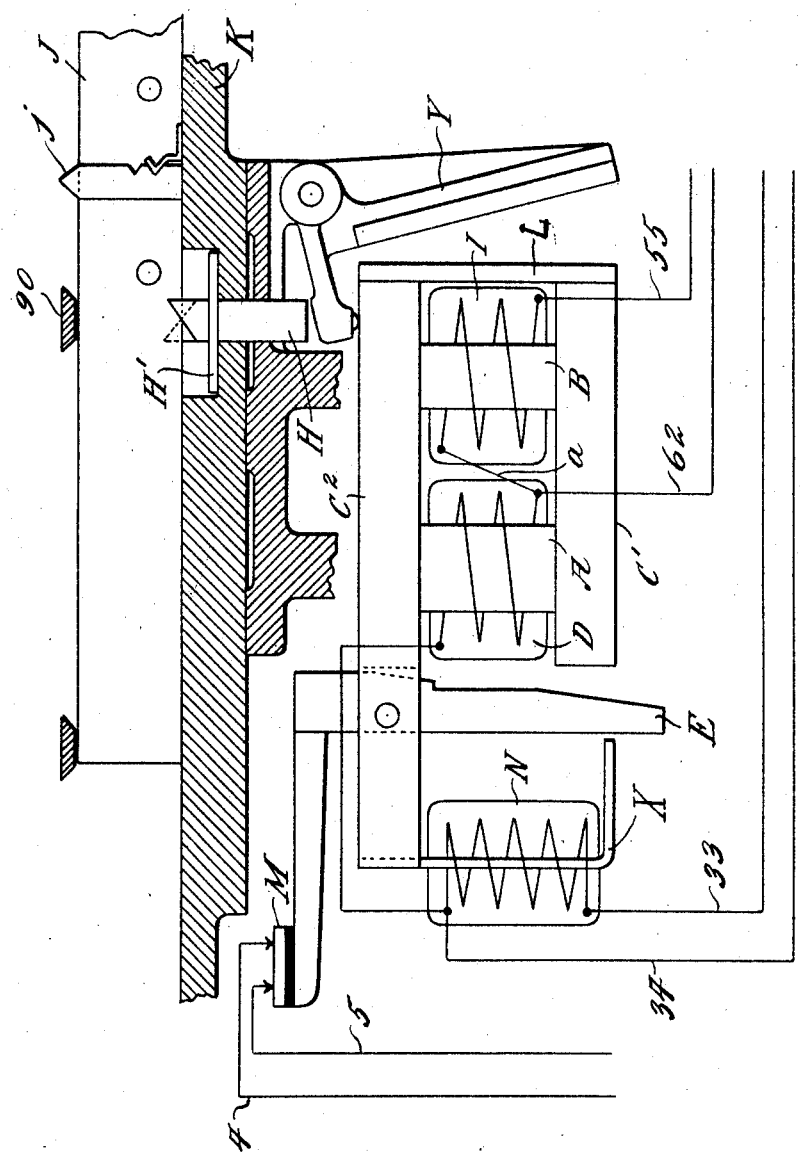
INVENTOR.
Wade H. Reichard
BY
Bruce & Mann
His ATTORNEYS.

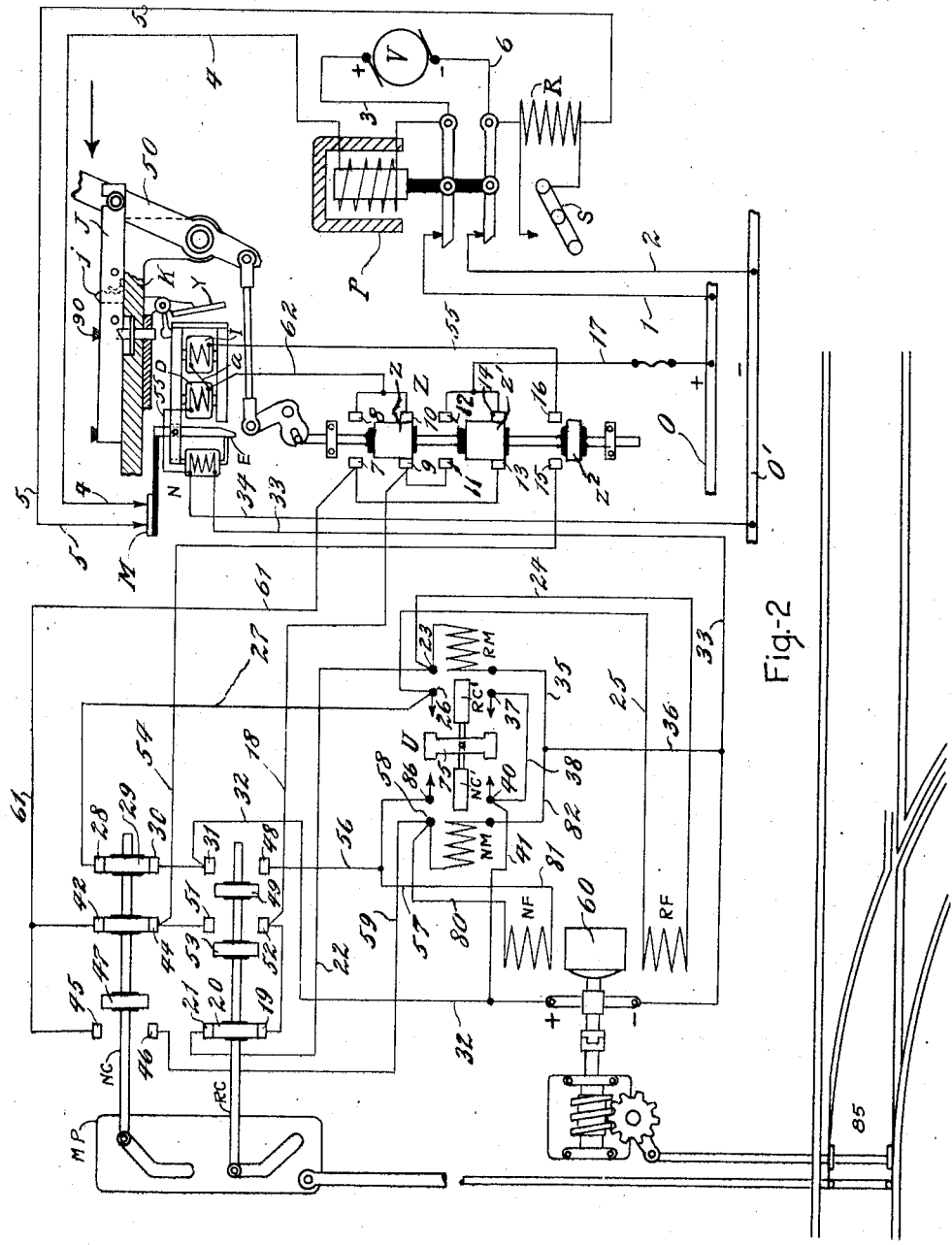

Patented Mar. 27, 1928.

1,664,088

UNITED STATES PATENT OFFICE.

WADE H. REICHARD, OF TROY, NEW YORK, ASSIGNOR, BY MESNE ASSIGNMENTS, TO GENERAL RAILWAY SIGNAL COMPANY, A CORPORATION OF NEW YORK.

ELECTRICAL CONTROL DEVICE.

Application filed May 24, 1923. Serial No. 641,074.

My invention relates to an electrically operated control device which is adapted to control the opening and closing of circuits, or for the operation of mechanical devices, or both. My invention is particularly useful in systems for controlling the movement of railway switches, whereby the system can be protected against "crosses", and the current used for operating the switch motor and for "indicating" that the switch has been moved in response to the movement of the lever may have the same characteristics. I will describe a control device embodying my invention, and its application to a system for controlling the movement of railway switches and then point out the novel features in claims.

In the accompanying drawings, Fig. 1 is a view partly in elevation and partly in diagram of a control device embodying my invention.

Fig. 2 is a diagrammatic view of a set of circuits, devices and apparatus for moving a railway switch and embodying my invention.

Similar reference characters designate corresponding parts in both of the figures.

Referring to Fig. 1, $C'$, $C^2$ designate two cores which are joined by cores A and B and by a leakage strip L. X designates a core and as here shown is supported from the core $C^2$, and at its free end is projected towards core $C'$. The cross-section of core A is large relative to the cross-section of core B, and the cross-section of core X is small relative to the cross-sections of the core B. Y designates an armature, here shown as being pivoted and which is adapted under certain conditions to be attracted to the cores $C'$, $C^2$. E also designates an armature, and also here shown as being pivoted and adapted under certain conditions to be attracted to the core X, under other conditions to be attracted to core $C'$. The cores may be supported in any desired manner according to the work to be performed by the device, and in Fig. 1 they are suitably supported from a frame K forming part of an interlocking machine. D designates a winding or coil on the core A, I designates a winding or coil on the core B, and N designates a winding or coil on the core X.

In order to explain the operation of the parts just described, it will be assumed that the windings or coils D, I are so positioned on their cores with respect to their turns and direction of current flow in them, that the core $C^2$ will become a north pole. When, therefore, a current flows in winding I alone, the flux produced by the M. M. F. of the coil flows from core B, to core $C^2$, core A, core $C'$ and back to core B. The magnetic flux will find other paths but as the path just described is of lower reluctance than any other, most of the magnetic flux will flow through this path and hence there will be no attraction of either of the armatures. When, however, current of the same polarity flows simultaneously in both windings D and I, the magnetic flux produced by the M. M. F. of these windings will be sufficient to saturate the leakage strip L and overcome the reluctance of the air gap between the cores $C'$, $C^2$ and armature Y and thus attract the armature Y to these cores. If desired, the windings D and I may be connected in series, to produce the effect last described and in the drawings this connection is designated $a$. If current flows in winding D alone, sufficient M. M. F. is generated by the winding to break down the reluctance of the air gap between the armature E and core $C'$ to attract the armature E to the core $C'$. If current flows in windings D and N in series and such flow is through the winding D in one direction and in winding N in a reverse direction, the magnetic flux produced by the M. M. F. of both windings (D and N) will neutralize or balance each other sufficiently so that no movement of the armature E will occur. If current flows through the winding N alone, sufficient M. M. F. is generated thereby to hold the armature E to the core X.

It will be obvious that the device of Fig. 1 can be used in various situations where different control of circuits or devices is desired, and one application of the device is shown in Fig. 2 which illustrates circuits and devices for controlling the movement of a railway switch. In this application of my invention the simultaneous current flow in windings D and I in a direction so that they both tend to send flux through the armature Y in the same direction is used to operate the "indication" means or devices associated with a control lever; the coil D is used to open a "safety circuit" when crosses occur, that is, to cut off the main source of power from the system, and the winding or coil N may be used to hold closed the "safety circuit" when a switch is to be moved.

Referring to Fig. 2, 50 designates one of a series of levers comprised in an interlocking machine, and 85 designates a railway switch which moves in response to the movements of the lever 50. The lever 50 and the switch 85 are in their "normal" positions, that is, for a straight track, and when the lever 50 is moved in the direction of the arrow to its "reverse" position, the switch 85 is also moved to its "reverse" position, that is, to a position where cars or trains can be diverted onto the branch track or siding. As is usual in such systems, the lever 50 when first moved closes circuits through the motor 60 which is mechanically connected with the switch 85, and the lever 50 is held in a certain position, generally known as the half reverse position, until after the switch 85 has been completely moved, after which, that fact is "indicated" through electro-mechanical devices which release the lever 50 so that its full movement to the full reverse position can be completed and thereby "release" other levers comprised in the interlocking machine. In the present case the lever 50 is connected with a slide bar J, which bar carries a dog or detent j. When the lever 50 is moved, the dog j is forced by bar 90 into a recess formed in the framework K onto a head H' of a plunger H. When the "indication" is received, and in the present instance when currents as hereinafter described are flowing in the same directions through the windings D and I and N, the armature Y is attracted and lifts the plunger H and thereby the dog j out of the recess, thus enabling the operator to complete the movement of the lever 50 to the full reverse or the full normal position, as the case may be.

V designates a source of supply of direct current which is connected through contacts controlled by a no-voltage release coil P by wires 1, 2 to bus bars O and O' from which current can be obtained to operate all of the electrical devices comprised in the system. The circuit for the operating coil P includes a contact M controlled by the armature E and may be traced as follows: from positive pole of the generator V, wire 3, coil P, wire 4, contact M, wire 5, resistance R and wire 6 to negative pole of the generator V. In practice, a switch S is first closed, which acts to close the contacts controlled by the coil P, after which the switch S is opened, but sufficient current will flow in this circuit with the switch S open to energize the coil P to an extent to maintain it normal when it has once been placed in its normal condition by closure of switch S, and thus have it keep its contacts closed. While Fig. 1 shows only one lever of the system, it will be apparent that in a multiple grouping of levers each individual control, such as contact M, will be connected in series with the coil P, so that in the event that any one of the contacts M is opened, its circuit (wires 4 and 5) will open the circuit of coil P, which will then release its contacts and cut off the generator V from the bus bars O, O' and thus from the system. The contact M will be opened when armature E is moved towards core C' which will be when the coil D alone is energized, and will be held closed when coil N alone is energized or will be held closed when coils D and N are energized.

The lever 50 is connected with a circuit controller generally designated Z for controlling circuits hereinafter described. The switch 85 has connected with it a motion plate MP in which are provided reversely arranged cam slots for operating the controller rods NC and RC respectively.

Fig. 2 illustrates the condition of the circuits and position of the parts when the track switch 85 is in its "normal" position, that is, for the straight track. When it is desired to "reverse" the position of the switch 85, that is, to move it to a position to divert traffic from the straight track, the lever 50 is moved in the direction of the arrow until the dog J is deflected onto the head H'. At the same time, controller Z is moved from the position shown to a position in which contact strip z bridges contacts 7, 8. and opens contacts 9, 10, contact strip z' bridges contacts 11, 12, and opens contacts 13, 14 and the contact strip $z^2$ bridges contacts 15 and 16. Current will then flow from positive bus bar O through wire 17, contact 12, strip z', contact 11 to contact 9, wire 18 through contact 19, bridging strip 20, contact 21, wire 22 to contact 23, wire 24, reverse field R. F. of motor 60, wire 25 to contact 26, wire 27 to contact 28, bridging strip 29, contact 30, contact 31, wire 32. through the armature of motor 60, wire 33. through winding N and wire 34 back to negative bus bar O'. At the same time that the above circuit was closed, a shunt circuit was also closed through a motor reverser as follows: from contact 23, coil RM, wires 35, 36, wire 33, winding N and wire 34 to bus bar O'. Core RC' is thus attracted to the winding RM and causes contact U to bridge the contacts 26, 37, whereupon current will still be supplied to the armature of the motor 60 through wire 38, contact 40 and wires 41, 32, even though the motor circuit first described was broken at the contacts 28 and 30 when the switch 85 started to move to its reverse position. As soon as the switch starts its movement, the controller rod NC completely opens the contacts 28, 30, the contacts 42, 44, and closes contacts 45, 46 through bridging strip 47. When the switch completes its movement, the controller rod RC opens the contacts 19, 21, and closes the contacts 31, 48, through bridging strip 49, and closes contacts 51, 52, through bridging strip 53. When the contacts 51 and 52 are closed by the contact strip 53, a circuit is closed as follows: positive bus bar O, wire 17, contact 12, bridging strip $z'$, contacts 11, 9, wire 18, contact 52, strip 53, contact 51, contact 44, wire 54, contact 15, strip $z^2$, contact 16, wire 55, winding I wire $a$, winding D, wire 55 and wire 34 to negative bus bar O'. The intensity of this current is comparatively small and practically all the magnetic flux is developed by the winding I and hence there will be no attraction of the armature Y. The reason that practically all of the magnetic flux, as just stated, is developed by the winding I is because the number of turns in winding I is many times that of the number of turns in winding D. However, the contacts 31 and 48 are closed at this time, and the following circuit is also closed: from the positive brush of the motor, wire 32, contact 31, strip 49, contact 48, wire 56, wire 57, field NF of the motor, contact 58, wire 59, contact 46, strip 47, contact 45, wire 61, contact 7, strip $z$, contact 8, wire 62, winding D, wire 55, winding N, wire 33 to negative pole of the armature. Since the armature is rotating at this particular instant and the circuits are set up in the proper direction through the field winding NF for field excitation, a generated current will flow in the circuit just described with the result that the reluctance of the core of winding D will be increased, or rather a counter magneto-motive-force is set up in the core A of the winding D which formerly formed a magnetic shunt for the leakage strip L. The combination of the dynamic current flowing through the winding D and the current flowing in winding I from the bus bar O will produce sufficient magnetic flux to attract the armature Y, and thus through the plunger H, lift the dog $j$ out of the recess and permit the lever to be moved to its final full reverse position. When the lever is moved to the full reverse position the contact $z^2$ again opens the circuit of coil I, so that current is not wasted.

Since the wire 61 is now connected to the field NF of the motor 60, and which field is excited when the switch 85 is to be moved to its "normal" position, it is apparent that any energy applied to wire 61 from positive bus bar O' would cause an operation of the motor 60. Such movement of the switch 85 would be unauthorized and dangerous to the safety of traffic being moved over the switch 85. To prevent such unauthorized movement of switch 85 is a purpose of the winding D and armature E. It will be remembered that in the movement of the switch 85 to its reverse position, and before the "indication" was made, current had to flow from the armature of motor 60 to winding D and that the return to the negative side of the armature was through winding N. If, however, this current had been from a "live wire" supplied from the positive bus bar O, then the current would find a path as follows: wire 61, contact 7, strip $z$, contact 8, wire 62, winding D, wire 55 and wire 34 to negative bus bar O'. As the winding D is then the only one with current flowing in it when the motor is operated by unauthorized current, armature E is attracted to core C' and the contact M moved to open the circuit on the winding P, thus permitting its contacts to drop and cut off the generator V from the bus bars O, O', and hence from the system. This action of the armature E is so rapid that there will be no appreciable movement of the switch 85.

When the switch 85 has been moved to its reverse position the lever 50, controller Z, motion plates MP and connected controller rods will be in positions the reverse of those shown in Fig. 2 except that the motor reverser will have the contact 75 bridging the contacts 26 and 37, that is, in the particular construction shown the armature 75 remains in the position to which it was last attracted. To return the switch 85 to its "normal" position the lever 50 is moved in a direction opposite to that indicated by the arrow, and the dog $j$ is again depressed onto the head H'. The control Z will then be in substantially the position shown, except that the strip $z^2$ will bridge contacts 15, 16. Current from positive bus bar O will then flow from wire 17, contact 14, strip $z'$, contact 13 to contact 7, wire 61, contact 45, strip 47, contact 46, wire 59, contact 58, wire 80, field NF, wire 81, wire 56, contacts 48, 49, 31, wire 32, armature of motor, wire 33, winding N and wire 34 to negative bus bar O'. A shunt path will be from contact 58, winding NM of motor reverser, wire 82 and wire 36 back to the negative bus bar O' through the path above traced. The core NC' is pulled into the winding NM and the contact 75 bridges the contacts 86, 40, so that current will flow after passing through the field NF and wire 81 to contact 86, contact 75, contact 40, wire 41, through the armature to wire 33 and back to negative bus bar O'. After the switch 85 has been moved to its "normal" position the motion plate MP will have returned the controller rods RC and NC to the positions shown in Fig. 2. Current will then flow from positive bus bar O, wire 17, contact 14, strip $z'$, contact 13, contact 7, wire 61, contact 42, strip 43, contact 44, wire 54, contact 15, strip $z^2$, contact 16, wire 55, winding I, wire $a$, winding D, wire 55 and wire 34 back to negative bus bar O'. At the same time dynamic current will flow from positive brush of the motor, wire 32, contact 31, contact 30, strip 29, contact 28, wire 27, contact 26, wire 25, field RF, wire 24, contact 23, wire 22, contact 21, strip 20, contact 19, contact 52, wire 18, contact 9, strip z, contact 10, wire 62, winding D, wire 55, winding N, wire 33 to the negative pole of the armature. This combined current in the windings N and D and I will attract the armature Y to lift the dog j, to release the lever and permit it to be returned to the full normal position, but will not attract armature E.

The same "cross protection" exists in this position of the switch 85, because if current from positive bus bar O should be in wire 18, it would find a path to the negative bus bar O' through the winding D, the circuit being wire 18, contact 9, strip z, contact 10, wire 62, and wires 55, 34, thereby attracting the armature E to open the safety circuit as before described.

Having thus described my invention, what I claim as new is:

1. A control device comprising a plurality of cores; a pivoted armature; a pair of windings for said cores; said cores and windings being so related that when current flows in one of said windings only the armature will not be attracted because the core containing the other winding forms a shunt for said armature, but will be attracted when current flows in both of said windings.

2. A control device comprising a plurality of cores; a pivoted armature; a pair of windings for said cores; and a separate source of current for each winding; said cores and windings being so related that when current flows in only one of said windings the core containing the other winding constitutes a shunt for said armature and the armature will not be attracted, but will be attracted when current flows simultaneously in both of said windings.

3. A control device comprising a plurality of cores; a pivoted armature; a second pivoted armature; a pair of windings for said cores in which current must flow simultaneously in said windings to attract the first armature, and if current flows in only one of said windings it will attract the second armature; a third winding for said cores which when current flows in it attracts the second armature, but which when current is also flowing in one of the two first mentioned windings has no effect on the second armature.

4. The combination in a traffic controlling system; a source of electric energy; a motor comprised in the system and operated from said source; a circuit including the armature of said motor in which dynamic current flows from the armature; an electro-magnetic device comprising two windings one of which is in circuit with the source of current and the other of which is included in the circuit in which dynamic current flows; and an armature operated by said windings when the dynamic current and current from the source of energy is flowing in them simultaneously.

5. The combination in a traffic controlling system; a source of energy for operating power devices comprised in the system; a motor comprised in the system and operated from said source; a circuit including the armature of said motor in which dynamic current flows from the armature, a winding included in the circuit in which dynamic current flows; a second winding in which current from the source flows; an armature operated by said windings when the said currents are flowing in them simultaneously; and a circuit including the first mentioned winding which when energized by an abnormal flow of current from said source cuts off the supply of current to the system from said source.

6. The combination in a traffic controlling system; a source of energy; a motor comprised in the system and operated from said source; a lever for controlling the supply of current to said source; indication means for indicating when the motor has operated in response to a movement of the lever and comprising a winding supplied with current from the source and a second winding supplied with dynamic current from the motor; and a circuit including one of said windings for controlling the supply of current from said source to the system.

7. In a dynamic indication system for controlling and indicating movements of traffic controlling devices for railroads; the combination of a traffic controlling device; a motor of the commutator type for operating said device; a source of direct current; a lever for controlling said motor; and indicating means for manifesting when said device has responded to a change in the position of said lever including an armature and two coils on magnetic cores arranged in multiple adjacent said armature of which one coil is energized by current derived from said direct current source to produce a flux in a certain direction in one of said multiple cores when said device gets into correspondence with said lever, and the other coil is energized to produce a flux in the same direction in the other of said multiple cores by current derived from said motor operating as a generator upon the completion of its movement of said traffic controlling device, whereby if one of said coils only is energized the core containing the other coil will form a magnetic shunt for said armature and shunt away the flux produced by said one coil.

8. In a dynamic indication system for controlling and indicating movements of traffic controlling devices for railroads; the combination of a traffic controlling device; a motor of the commutator type for operating said device; a source of direct current; a lever for controlling said motor; and indicating means for unlocking said lever including an armature, and means for operating said armature effectve only if both current derived dynamically from said motor due to the inertia of said motor upon the completion of its operating stroke and current derived from said source of direct current through a contact only closed upon the completion of said stroke are flowing at the same time.

9. In a dynamic indication system for controlling and indicating movements of traffic controlling devices for railroads; the combination of a traffic controlling device; a motor of the commutator type for operating said device; a source of direct current; a lever for controlling said motor; and indicating means for unlocking said lever including an armature, and means for operating said armature effective only if both current derived dynamically from said motor due to the inertia of said motor upon the completion of its operating stroke and current derived from said source of direct current through a contact only closed upon the completion of said operating stroke, are flowing at the same time, said indicating means including means for disconnecting said source from the system if current derived from said source tending to operate said motor to a position not corresponding to that of the lever is applied thereto.

10. In a dynamic indication system for controlling and indicating movements of traffic controlling devices for railroads; the combination of a traffic controlling device; a motor of the commutator type for operating said device; a source of direct current; a lever for controlling said motor; and indicating and cross protection means for preventing said lever and said device from getting out of correspondence comprising, a pair of coils contained on a closed magnetic circuit having an armature associated therewith, and a single coil linking an open magnetic circuit having an armature associated therewith which armature is also disposed adjacent to said closed magnetic circuit, indicating means associated with the first mentioned armature, and circuit breaking means associated with the second mentioned armature, the said coils being so arranged in the system that the fluxes of the first mentioned coils buck each other as far as the closed magnetic circuit is concerned, thereby attracting the first mentioned armature when an indication is received, and being further so arranged that the fluxes due to current in one of the pair of coils and the second mentioned coil is cumulative in the second mentioned armature when the motor is operated by current supplied through said lever and the fluxes due to current in one of the pair of coils and the second mentioned coil are non-cumulative in their action on the second mentioned armature when current is supplied to said motor through a circuit not including said lever.

11. A cross protection mechanism for systems for operating traffic controlling devices for railways electrically comprising; a traffic controlling device; a motor for operating said device; a source of current; a lever for applying current from said source to said motor; and circuit breaking means for cutting said source of current off of said system including an armature, two cores each of which if a magneto-motive-force is induced therein is adapted to attract said armature one of which is larger in cross section than the other of which the smaller one is normally engaged by said armature, a coil on each of said cores, whereby if currents flow in said coils to magnetize said armature in the same direction the tractive force of the small core predominates over that of the other, and if current flows only in the other coil said armature will be operated.

12. In a dynamic indication and control system for electrically controlling and indicating the position of railway traffic controlling devices, the combination of a traffic controlling device, a motor for operating said device, a lever having contacts associated therewith for controlling said motor, indicating means associated with the lever including two coils and an armature which armature only responds to give an indication if both of said coils are energized by direct current flowing so as to have a predetermined relation, an indication circuit for energizing one of said coils including a source of direct current closed only if said device and said lever are in a corresponding position, and another indication circuit including said other coil energized by current generated by said motor after said motor has completed an operating stroke providing said device and said lever are in a corresponding position, the currents flowing in the two mentioned indication circuits having said predetermined relation and actuating said armature under the conditions mentioned, whereby an indication is only received if currents of the proper character are flowing in both of said two coils at the same time.

13. Indication means for indicating when a motor operated traffic controlling device and the lever for controlling said motor assume a corresponding position comprising, an armature, and indicating means for operating said armature including two circuits each of which is energized from a different source of supply, said armature being operated only if both of said circuits have currents of the proper character flowing therein at the same time.

14. Indication means for indicating when a motor operated traffic controlling device and the lever for controlling said motor assume a corresponding position comprising, a soft iron armature, means for operating said armature including two separate coils so arranged with respect to cores associated therewith that said armature is operated only if currents having a predetermined relation flow in both of said coils simultaneously.

15. In a dynamic indication system for controlling and indicating movements of traffic controlling devices for railroads; the combination of a traffic controlling device; a motor of the commutator type for operating said device; a source of current; a lever for controlling said motor; and indicating means for unlocking said lever including an armature, and means for operating said armature effective only if both current derived dynamically from said motor due to the inertia of said motor upon the completion of its operating stroke and current derived from source through a contact only closed upon the completion of said stroke are flowing at the same time.

16. Cross protection means for cutting the source of current off of electrically operated traffic controlling apparatus to avoid such apparatus being operated accidentally by currents not flowing through the operating contacts of the operating lever by reason of a cross, or the like, comprising; a soft iron armature, and two coils disposed adjacent said armature, said coils being so arranged in the operating circuits that if current for operating the traffic controlling apparatus flows through the operating contacts of the lever the armature is attracted to the circuit closing position, and if current accidentally applied to the traffic controlling device which does not flow through the operating contacts is flowing it so flows in said coils that the armature is attracted to a position to cut off said source of current.

17. Cross protection means for cutting the source of current off of electrically operated traffic controlling apparatus to avoid such apparatus being operated accidentally by currents not flowing through the operating contacts of the operating lever by reason of a cross, or the like, comprising; a circuit interrupter, and means for operating said circuit interrupter including two circuits and effective only if current is flowing in one of said two circuits only.

18. A control device for operating mechanism which should only be operated when a plurality of currents of predetermined character are flowing comprising, an armature, a core structure adjacent said armature including two core portions in multiple, and a coil on each of said core portions, whereby if one of said coils only is energized the core portion containing the other coil serves as a magnetic shunt for said armature, and whereby said armature is only operated if currents having a certain relation flow in both of said coils.

19. A control device for railway traffic controlling mechanism comprising, a core having two portions one of high reluctance and one of low reluctance, a pivoted armature supported between said core portions normally engaging the core portion of high reluctance, and a coil on each of said core portions, whereby if said coils are energized by currents of predetermined magnitude flowing in a direction to produce a cumulative effect on said armature the armature will remain in the normal position, and if current flows in the core of low reluctance only said armature assumes a position to engage the core portion of low reluctance.

20. A control device comprising a plurality of stationary cores arranged in multiple; a pivoted soft iron armature arranged so that it may complete a magnetic circuit through both of said cores simultaneously; a winding associated with each of said cores, said cores and windings being so related that when current flows in both windings the armature will not be operated in a particular direction by magnetic attraction, but will be moved in such direction when current flows in one of said windings only.

21. An interlocking system comprising, a railway traffic controlling device, power operated means for operating said device, a lever for controlling said power operated means, means for indicating when said device has operated in response to movement of said lever, means including two coils for cutting off the power if said device is operated by unauthorized current, and means for indicating if either of these two coils is either open-circuited or short-circuited.

22. An interlocking system comprising, a railway traffic controlling device, power operated means for operating said device; a lever for controlling said power operated means, means for indicating when said device has operated in response to movement of said lever; means including a coil for cutting off the power if said device is operated by current due to a cross, or the like; and means for indicating if said coil is either open-circuited or short-circuited.

23. An interlocking system, the combination of a lever interlocked with other levers, a power operated traffic controlling device controlled by said lever, locking means for locking said lever, means for unlocking said locking means when said traffic controlling device has responded to the movement of said lever including two coils, said last mentioned means failing to function if either of said coils has been either open-circuited or short-circuited.

24. A combined cross-protection and indication device for electrically operated interlocking systems comprising; a core structure containing three windings; two armatures associated with said core structure; said armatures, windings and core structure being so related that one of said armatures is operated and the other armature is not operated if all the windings have current flowing therein, and the other armature is operated if current flows in one of said windings only.

25. A combined cross-protection and indication device for electrically operated interlocking systems comprising; a core structure containing three windings; two armatures associated with said core structure; said armatures, windings and core structure being so related that if current flows simultaneously in a given pair of said windings neither of said armatures is operated, if current flows in a second different pair of windings neither of said armatures is operated, but if current flows in the third different pair of said windings both of said armatures are operated.

26. A combined cross-protection and indication device for electrically operated interlocking systems comprising; a core structure containing a first, a second and a third winding; two armatures associated with said core structure; said armatures, windings and core structure being so related that if current flows simultaneously in the first and second winding neither of said armatures is operated; if current flows in the first and third windings neither of said armatures is operated, but if current flows in the second and third windings both of said armatures are operated.

27. A combined cross-protection and indication device for electrically operated interlocking systems comprising; a core structure containing a first, a second and a third winding; two armatures associated with said core structure; said armatures, windings and core structure being so related that if current flows simultaneously in the first and second winding neither of said armatures is operated, if current flows in the first and third winding neither of said armatures is operated, but if current flows in the second and third of said windings both armatures are operated, and if current flows in all three windings only one of said armatures is operated.

WADE H. REICHARD.